US012739547B2

(12) United States Patent
Jepsen et al.

(10) Patent No.: US 12,739,547 B2
(45) **Date of Patent: *Sep. 15, 2026**

(54) DUST CAP ILLUMINATION

(71) Applicant: HARMAN INTERNATIONAL INDUSTRIES, INCORPORATED, Stamford, CT (US)

(72) Inventors: Henrik Kirkeby Jepsen, Vinderup (DK); Marcel Pilgaard Havemann, Hjerm (DK); Henrik Muusmann Jørgensen, Struer (DK)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/205,700

(22) Filed: May 12, 2025

(65) Prior Publication Data

US 2025/0274691 A1 Aug. 28, 2025

Related U.S. Application Data

(63) Continuation of application No. 18/525,651, filed on Nov. 30, 2023, now Pat. No. 12,323,752.

(30) Foreign Application Priority Data

Dec. 1, 2022 (EP) .................................... 22210806

(51) Int. Cl.
*H04R 1/02* (2006.01)
*F21S 10/00* (2006.01)
(Continued)

(52) U.S. Cl.
CPC ............ *H04R 1/028* (2013.01); *F21S 10/005* (2013.01); *F21S 10/023* (2013.01); *F21V 14/08* (2013.01);
(Continued)

(58) Field of Classification Search
CPC ............................ F21V 33/0056; H04R 1/028
See application file for complete search history.

(56) References Cited

U.S. PATENT DOCUMENTS 9,807,485 B1 10/2017 Ivey et al.
10,219,061 B2 * 2/2019 Cook .................. F21V 33/0056
(Continued)

FOREIGN PATENT DOCUMENTS

DE 11 2021 007 815 T5 4/2024
EP 3 641 331 A1 4/2020
EP 3 952 327 A1 2/2022

*Primary Examiner* — Alexander K Garlen
(74) *Attorney, Agent, or Firm* — Artegis Law Group, LLP

(57) ABSTRACT

Described embodiments include an audio speaker configured to emit sound in a main sound emission direction. The audio speaker comprises a voice coil, a movable diaphragm connected to the voice coil and configured to move together with the voice coil, the movable diaphragm comprising, in a direction opposite the main sound emission direction, a front surface and a rear surface opposite the front surface. The audio speaker further comprises a light source configured to emit light which is located, in a direction of the main sound emission direction, below the voice coil, and a light guide configured to guide the light emitted from the light source to the front surface of the movable diaphragm.

18 Claims, 7 Drawing Sheets

(51) Int. Cl.

| | |
|---|---|
| ***F21S 10/02*** | (2006.01) |
| ***F21V 14/08*** | (2006.01) |
| ***F21V 29/10*** | (2015.01) |
| ***F21V 33/00*** | (2006.01) |
| ***H04R 9/04*** | (2006.01) |

(52) U.S. Cl.

CPC ......... *F21V 33/0056* (2013.01); *H04R 9/045* (2013.01); *F21V 29/10* (2015.01); *F21V 2200/15* (2015.01)

(56) References Cited

U.S. PATENT DOCUMENTS

| | | | | |
|---|---|---|---|---|
| 10,750,290 | B2 * | 8/2020 | Qiu | F21V 33/0052 |
| 10,924,832 | B2 * | 2/2021 | Cook | H04R 9/022 |
| 11,384,931 | B2 * | 7/2022 | Warren | F21V 23/003 |
| 2008/0285257 | A1 | 11/2008 | King | |
| 2010/0316247 | A1 | 12/2010 | Ding | |
| 2014/0192513 | A1 | 7/2014 | Yim et al. | |

* cited by examiner

DUST CAP ILLUMINATION

CROSS-REFERENCE TO RELATED APPLICATIONS

This application is continuation of U.S. patent application Ser. No. 18/525,651 entitled "DUST CAP ILLUMINATION", filed Nov. 30, 2023, and claims the priority of European Patent Application Number 22210806.0 entitled "DUST CAP ILLUMINATION," filed on Dec. 1, 2022. The subject matter of these related applications is hereby incorporated herein by reference.

TECHNICAL FIELD

The present application relates to an audio speaker and more particularly to an audio speaker configured to emit light.

BACKGROUND

Audio speakers are used for generating and emitting acoustic sound waves. This is mainly achieved by causing movements of a movable diaphragm by means of a voice coil connected to the diaphragm. Furthermore, there is an increasing need to provide audio speakers which are illuminated with light. For an illumination of an audio speaker using light sources provided at or in the speaker it has to be made sure that the space requirements are not greatly increased when a light source is added to the loudspeaker, especially in the environment when the speaker is installed in a vehicle where limited space is available for the audio speaker. Furthermore, it has to be made sure that the light source is located at a position where a heating of the light source is avoided as the repeated heating of the light source used for illuminating the speaker would decrease the lifetime of the light source.

Accordingly, a need exists to provide an audio speaker, which can be illuminated, has small space requirements and where the heating of the light source is avoided.

SUMMARY

This need is met by the feature of the independent claim. Further aspects are described in the dependent claims.

According to a first aspect an audio speaker is provided configured to emit sound in a main sound emission direction, wherein the audio speaker comprises a voice coil, a movable diaphragm connected to the voice coil and configured to move together with the voice coil, wherein the movable diaphragm comprises in direction opposite the main sound emission direction, a front or upper surface and a rear surface opposite the front surface. Furthermore, a light source is provided configured to emit light, which is located in a direction of the main sound emission direction, below the voice coil. Furthermore, a light guide is provided configured to guide the light emitted from the light source to the front surface of the movable diaphragm.

The audio speaker as described above has the advantage that the light source can be positioned at a position within the audio speaker, where it is not heated by heat generated by the voice coil and with the positioning below the voice coil it is possible to keep a volume of the loudspeaker that is not substantially increased by the added light source. The location of the light source and the use of the light guide allow light to be emitted from the audio speaker without requiring the light source to be positioned at or near the movable diaphragm or at or near the voice coil. The light source can be arranged at a more suitable position, especially at a position behind the voice coil as seen from the front side of the loudspeaker, where it is not exposed to heat generated by the different parts of the audio speaker during operation. When looking at the speaker from behind the speaker in the main sound emission direction, the light source is placed first and then the voice coil follows. Accordingly, it is possible to protect the light source from heat exposure. Thus, the expected lifetime of the light source is not decreased by the heating through the audio speaker.

It is to be understood that the features mentioned above and features yet to be explained below can be used not only in the respective combinations indicated, but also in other combinations or in isolation without departing from the scope of the present disclosure. Features of the above mentioned aspects and embodiments described below may be combined with each other in other embodiments unless explicitly mentioned otherwise.

BRIEF DESCRIPTION OF THE DRAWINGS

Other devices, systems, methods, features and advantages of the disclosure will be or will become apparent to one with skill in the art upon examination of the following detailed description and figures. The features and effects of the application will especially become apparent from the following detailed description when read in conjunction with the accompanying drawings in which like reference numerals refer to like elements.

DETAILED DESCRIPTION

Figure 1:
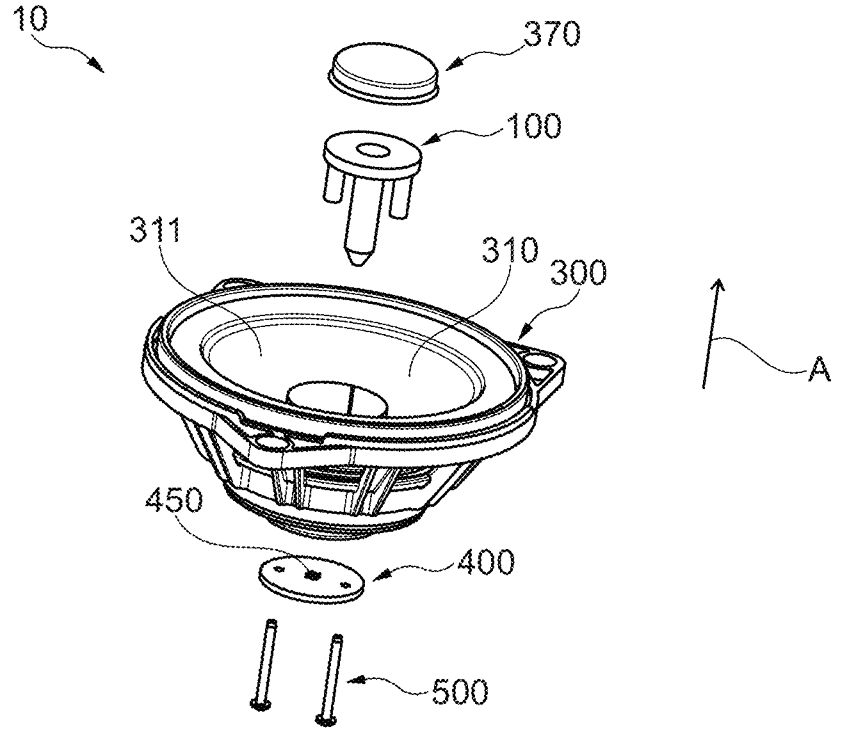
FIG. 1 shows an exploded view of the audio speaker which is illuminated by a light source.

In the following, embodiments of the disclosure will be described in detail with reference to the accompanying drawings. It is to be understood that the following description of embodiments is not to be taken in a limiting sense. The scope of the disclosure is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

In the present context the term 'audio speaker' should be interpreted to mean a device that is capable of generating and emitting acoustic waves by actuating a movable diaphragm into a main sound emission direction. Thus, the audio speaker according to the present disclosure includes a movable diaphragm and a voice coil arranged to actuate the movable diaphragm. During operation of the audio speaker, voice coil receives appropriate input signals and operates in response to the received input signals in such a manner that it causes the movable diaphragm to move or vibrate and thereby generate acoustic waves in accordance with the input signals.

Referring to FIG. 1, an audio speaker 10 is provided which includes a speaker unit 300, a light guide 100, a light source 450 provided on a circuit board 400 and a cap 370 connected to a center part of a diaphragm 310. The circuit board 400 is connected to the speaker unit 300 using fixing elements 500 such as screws. As will be explained below, light generated by the light source 450 will pass through the light guide 100 in order to illuminate a front surface 311 of the diaphragm 310.

In the present context, the term 'light source' should be interpreted to mean a device that is configured to generate light, i.e., electromagnetic waves, preferably within a wavelength range which is visible to a human eye. However, it is not ruled out that the light source is capable of generating electromagnetic waves at wavelengths outside the visible range, such as infrared and/or ultraviolet light. The light source could, e.g., be or include one or more Light Emitting Diodes (LEDs), a laser, a Laser Activated Remote Phosphor (LARP) light source, and/or any other suitable kind of light source.

In the present context, the 'light guide' 100 should be interpreted to mean a component or element that is configured to guide light from one position to another. The light guide could, e.g., be or include a waveguide, an optical fibre with a core and a cladding layer, one or more reflective elements, one or more refractive elements, and/or any other suitable optical elements.

The light guide 100 is arranged to guide light emitted from the light source 450 to the front surface of the diaphragm 310. As will be explained in further detail below, the light source 450 is positioned a distance away from the movable diaphragm 310, and thereby also a distance away from a location where the light exits the light guide and is directed to the front surface of the loudspeaker. Thus, the light guide interconnects the light source and front surface of the diaphragm so that the light emitted from the light source is guided, by the light guide 100, from the position of the light source to an opening window in the light guide near the movable diaphragm 310. This allows light to be emitted from the audio speaker at a position at or near the movable diaphragm without requiring the light source to be positioned at or near the movable diaphragm. Instead, the light source is located at a position where it is not exposed to heat generated by a voice coil used to control the movement of the diaphragm, or other heat generating components of the audio speaker, and the detrimental effects on an expected lifetime of the light source caused by such a heat exposure can be reduced or avoided.

Figure 2:
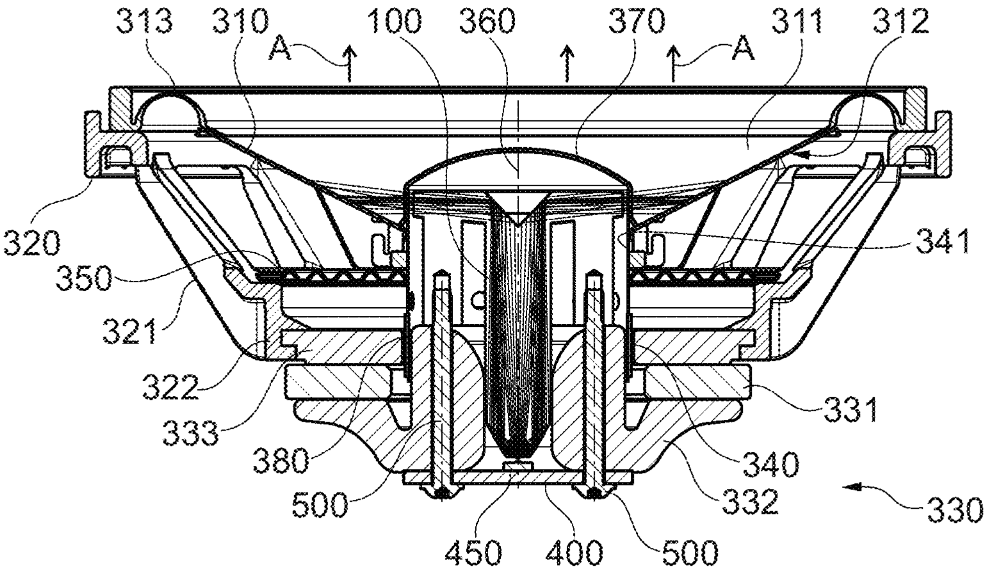
FIG. 2 shows a schematic cross-sectional view of the audio speaker of FIG. 1 with a first position of a movable diaphragm of the loudspeaker.

Referring also to FIG. 2, the audio speaker 10 emits sound into a main sound emission direction, which is indicated by arrow A in FIGS. 1 and 2. In FIGS. 1 and 2, the space into which the sound is mainly emitted is the space in front of the loudspeaker and a user looking onto the audio speaker in a direction opposite the main sound emission direction is looking at a front surface of the loudspeaker, especially the front or upper surface 311 of the diaphragm 310 of the audio speaker. The speaker unit 300 includes the movable diaphragm 310, which is connected to a frame 320 via a flexible surround 313 which allows a movement of the diaphragm 310 perpendicular to a main or middle axis 360 and in direction of the main sound emission direction also indicated by arrow A in FIG. 2. The speaker 300 furthermore includes a drive unit 330 configured to generate a magnetic field in which a voice coil 340 is positioned and moved in direction of the middle axis 360.

As can be especially deduced from FIG. 2 the circuit board such as a printed circuit board 400 is connected to a lower part of the drive unit 330 and the light source 450 is connected to the circuit board emitting light in direction of the main sound emission direction. The light guide 100 collects and guides the light emitted by light source 450 from a rear part of the loudspeaker to a front part of the loudspeaker where the light exits the light guide 100 in order to illuminate the upper or front surface 311 of diaphragm 310. In the following the position of the different elements present in the audio speaker 10 is described relative to the main sound emission direction. Accordingly the circuit board 400 and the light source 450 are connected to a lower or rear part of the drive unit 330. Looking on the speaker 10 in a direction opposite the main sound emission direction, the diaphragm 310 includes the upper surface 311 and a lower surface 312. The upper surface 311 is the front surface facing the space above the loudspeaker to which the sound is emitted, wherein the rear surface is opposite the front surface and faces an interior of the loudspeaker and is normally not visible from the outside for a user looking at the loudspeaker from the front side. The drive unit 330 includes a permanent magnet 331, a first pole piece 332 and a second pole piece 333. The permanent magnet 331 provides a static magnetic field with field lines passing through the pole pieces 332 and 333 and a cylindrical air gap 380 is formed between the first pole piece 332 and the second pole piece 333 where a homogeneous magnetic field is provided. The voice coil 340 is arranged in the air gap 380 so that changes in a varying magnetic field induced by the voice coil 340 when a varying current is applied to the windings of the voice coil 340 causes the voice coil 340 to move in an axial direction, i.e. parallel to the central middle axis 360. The voice coil 340 is connected to the movable diaphragm 310 via a support 341 and is therefore arranged to move together with the diaphragm 310 in order to generate and emit the acoustic waves from the audio speaker 10.

The light guide 100 is fixedly connected to the first pole piece 332 as shown in FIG. 2. In the embodiment shown, screws are used as fixing elements 500 in order to connect the light guide 100 and the circuit board 400 to the pole piece 332, however any other fixing mechanism might be used. When current is fed through the voice coil 340, the latter will move together with the diaphragm 310 parallel to the axis 360, wherein the movement is furthermore guided by a centering element 350, also called spider. The diaphragm 310 can be a cone shaped diaphragm and is connected at its center portion to the protective cap 370 which closes the loudspeaker in direction of the front surface. The diaphragm 310 has a central opening which is closed by the cap and when the diaphragm is moved, the cap 370 moves together with the diaphragm 310.

Figure 4:
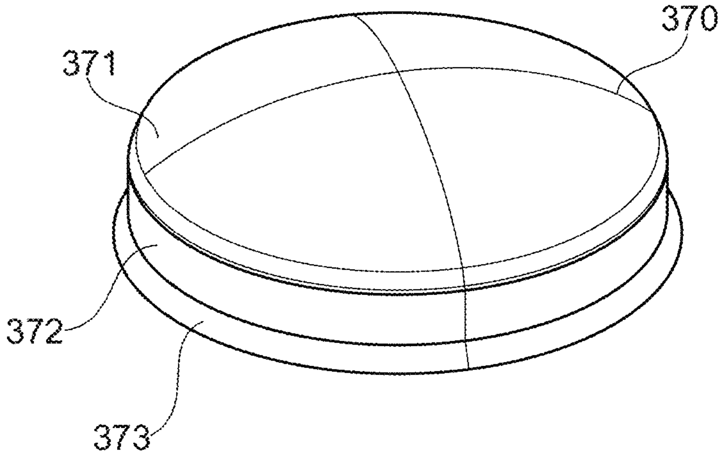
FIG. 4 shows a perspective view of a dust cap used in the audio speaker of FIGS. 1 and 2.

FIG. 4 shows a more detailed view of the cap 370. The cap includes a connecting portion 373 by which the cap 370 is connected to the diaphragm 310 and the support 341 of the voice coil. The cap furthermore includes a transparent side surface 372 and a top surface 371 which includes a material not transparent to the light emitted by the light source 450. The transparent side surfaces will be used as window to illuminate the front surface 311 of diaphragm 310.

Figure 3:
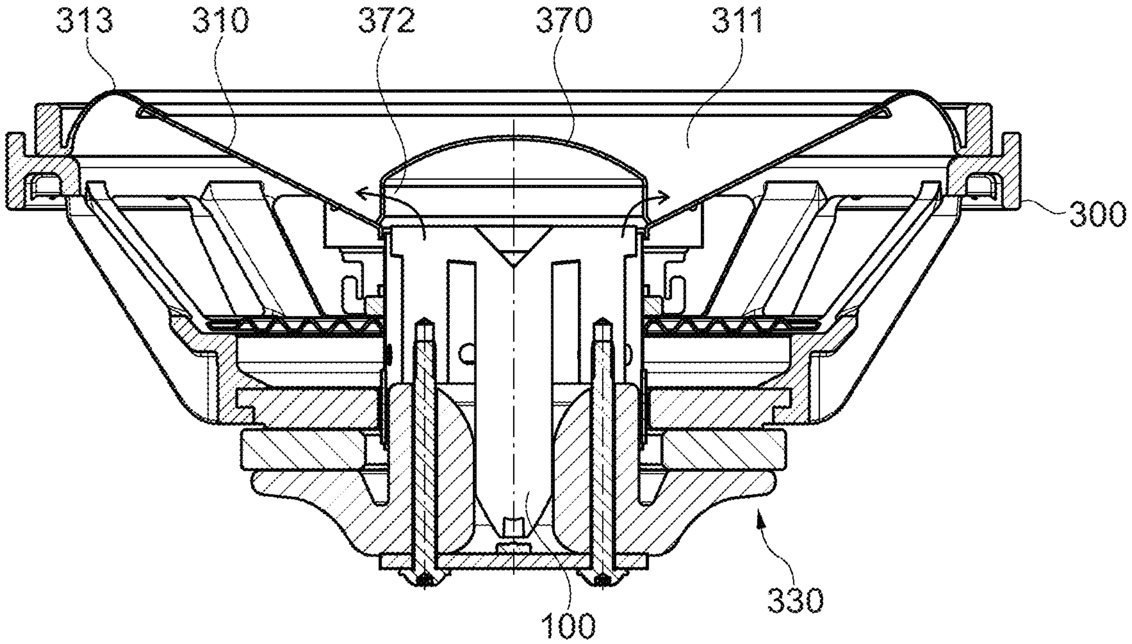
FIG. 3 shows a schematic cross-sectional view of the audio speaker of FIGS. 1 and 2 with a second position of the movable diaphragm.

Returning to FIG. 3 a position of the diaphragm is shown, which is the uppermost position of the diaphragm 310 relative to the drive unit 330, providing the maximum excursion and distance of the diaphragm relative to the drive unit 330, whereas FIG. 2 shows a rest position of the diaphragm 310 in which no current is fed to the voice coil. In the position shown in FIG. 3, the light emitted by the light source and guided through the light guide 100 can easily pass through the transparent side surface 372 of the cap 370. When the diaphragm 310 moves to the other maximum excursion position towards the bottom of the speaker unit 300 less or nearly no light can pass through the transparent side surface 372, as the non-transparent top surface 371 of the dust cap 370 might cover the upper section of the light guide. In the rest position shown in FIG. 2 light from the light source 450 can also pass through the transparent side surface 372, whereas this might not be the case when the lower maximum excursion of the diaphragm is obtained. The transparent side surface 372 provides an opening window through which the light exiting the light guide can pass to the front surface 311 of the diaphragm 310 as will be explained later in connection with FIG. 10.

The light guide 100 is fixedly positioned on the drive unit 330 whereas the cap 370 with the transparent side surface 372 moves in the main sound emitting direction together with the voice coil. As a consequence, the amount of light passing through the opening window varies together with the movement of the diaphragm. In conclusion the amount of light that can pass through the opening window in the transparent side surface 372 can be direct proportional to the position of the cap 370 along the middle axis 360 relative to the light guide. The higher the diaphragm and the dust cap 370 moves in direction of the main sound emission direction, the more light can exit the emitting window, whereas the more the diaphragm 310 moves in a direction opposite the main sound emission direction, the smaller the opening window becomes.

Figure 5A:
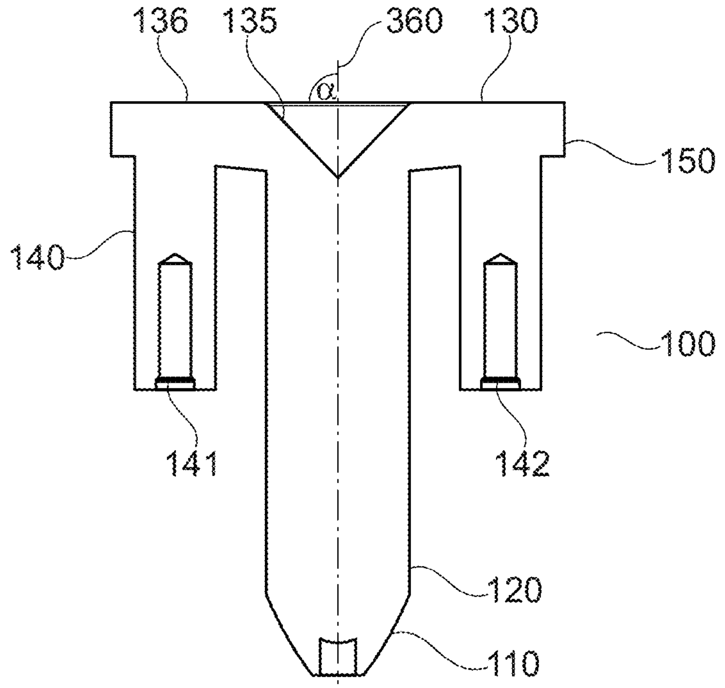
FIGS. 5*a* and 5*b* show a schematic sectional view of a light guide used in the audio speaker shown in FIGS. 1 to 3 without and with light rays.
Figure 5B:
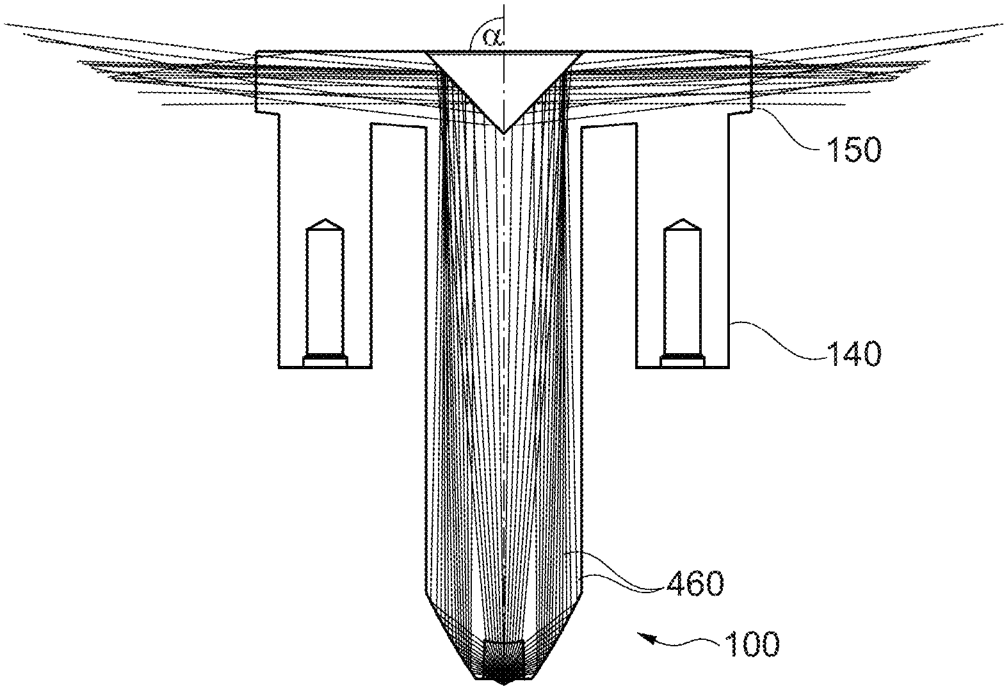

FIGS. 5*a* and 5*b* show in more detail a first embodiment of the light guide 100. FIG. 5*a* shows the light guide 100 without the light rays emitted by the light source. FIG. 5*b* indicates how the light guide 100 guides the light rays to a light emitting surface 150. As shown in FIG. 5*a*, the light guide 100 includes an inlet portion 110 where a light from the light source enters the light guide 100 and where the light rays are distributed such that the rays 460 shown in FIG. 5*b* follow a path which is substantially parallel to the middle axis 360. The light guide 100 includes a middle portion 120 through which the light is guided to an outlet portion 130, where the main light emitting surface 150 is provided. The middle portion 120 has a cylindrical shape and can have a circular cross section, however it might also have a cross section designed as a polygon. At the outlet portion 130 the light path is changed from a main direction parallel to the middle axis 360 to a direction substantially perpendicular to the middle axis 360. The light guide furthermore includes connecting arms 140 extending from the outlet portion in a direction parallel to the middle axis in a direction opposite the main sound emission direction, wherein a free end of the connecting arms 140 is connected and fixed to the drive unit, here the first pole piece 332. The connecting arms 140 include receiving openings 141 and 142 configured to receive the fixing elements 500 shown in FIG. 1 or 2. The light guide 100 includes in the outlet portion 130 a prism 135, which is provided to change the direction of the light path from a direction parallel to the to the middle axis to a direction perpendicular to the middle axis 360. The prism 135 has reflecting surfaces configured to obtain the redirection of the light path. The entire light guide 100 can be made of a material transparent to light, but has internal reflecting surfaces such that a total internal reflection, TIR, is generated in the light guide. All the side surfaces are implemented as reflecting surface, reflecting light that hits the surface in an angle smaller than a defined angle such as 20° or 30°. This helps to make sure that a major part of the light guided through the light guide will exit the light guide at the light emitting surface 150. In the example shown in FIG. 5 a top surface 136 of the light guide is designed as being perpendicular to the middle axis 360. Accordingly, an inclination angle α of approximately 90° is provided with a being defined by the angle between the top surface 136 and the middle axis 360. As shown in FIG. 5*b* this inclination angle α also controls the distribution of the light rays which exit the light emitting surface 150 and which illuminate the front surface 311.

Figure 6:
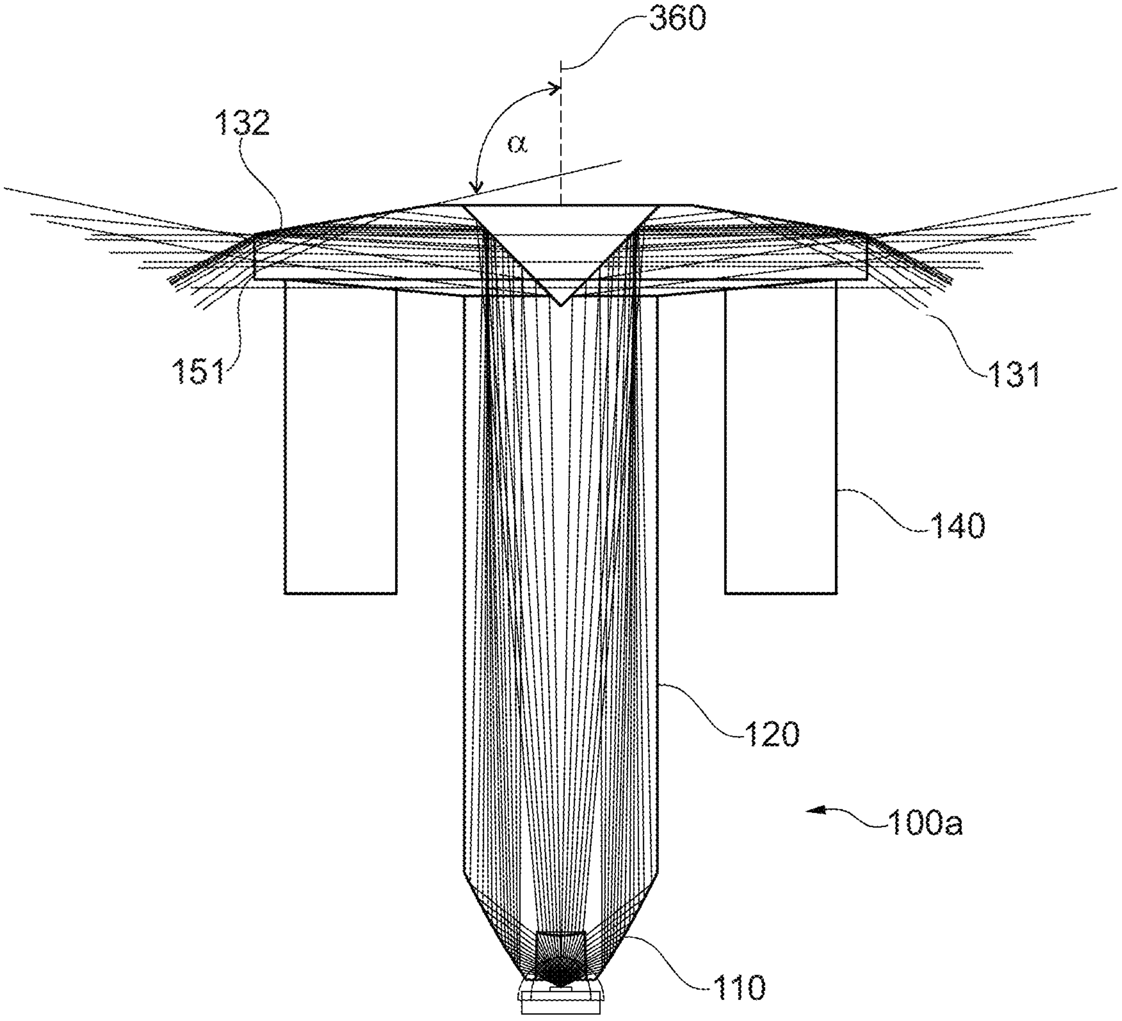
FIG. 6 show a schematic sectional view of another light guide used in the audio speaker shown in FIGS. 1 to 3 with light rays.

FIG. 6 shows a slightly different embodiment of the light guide 100*a*. This light guide differs from the light guide from FIGS. 5*a* and *b* by a shape of the outlet portion 131. In FIGS. 5*a* and 5*b* the top surface 136 was substantially perpendicular to the middle axis, whereas in the embodiment of FIG. 6, top surface 132 is inclined relative to the middle axis 360 such that an end section of the top surface 132 provided at an radial outer part of the outlet portion is inclined in a direction opposite the main sound emission direction so that the angle α between the inclined surface and the middle axis 360 is larger than 90°, preferably between 90° and 110°. The top surface 132 and its inclination relative to the middle axis 360 influences the illumination of the front surface of the diaphragm 310. The inclined surfaces such as surface 132 lead to a more focused light distribution or light beam, which exits at the light emitting surface 151 compared to the situation shown in FIG. 5B. In FIG. 5*b* the opening angle of the emitted rays is larger so that as a result in the embodiment of FIG. 5*b* a larger section of the front surface 311 of the diaphragm 310 is illuminated compared to the situation shown in FIG. 6. Summarizing, this means that the inclination or shape of the top surface 132 or 136 helps to control the amount of the diaphragm to be illuminated.

Figure 7:
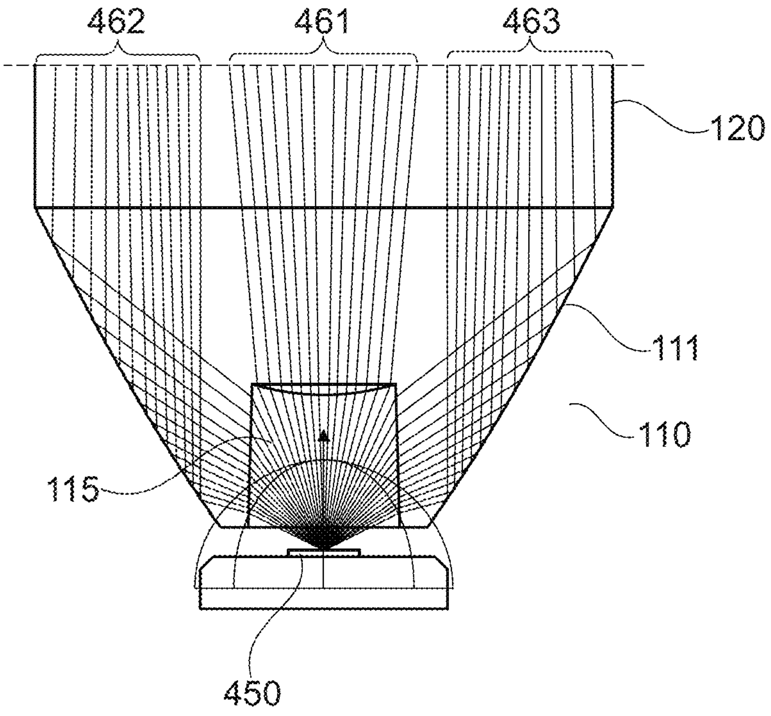
FIG. 7 shows a sectional view of the lower part of the light guide used in the audio speaker.

FIG. 7 shows the inlet portion 110 of the light guide in more detail. The light emitted by the light source 450 illuminates the inlet portion such that substantially all the light beams emitted by light source 450 are fed to the inlet portion 110. At the entrance a lens 115 is provided which focusses the emitted light in such a way that a first light beam 461 is generated, which is directed in direction of the middle axis in such a way that it hits the prism 135 without being reflected by one of the inner side walls of the middle portion 120 of the light guide. The other parts of the light not influenced by lens 115 is reflected at a conical section 111 of the inlet portion 110 such that they are also directed towards the prism 135. These light beams 462 and 463 are also directed towards the outlet portion where they are reflected substantially perpendicular to the middle axis 360 and perpendicular to the main sound emission direction.

Figure 8:
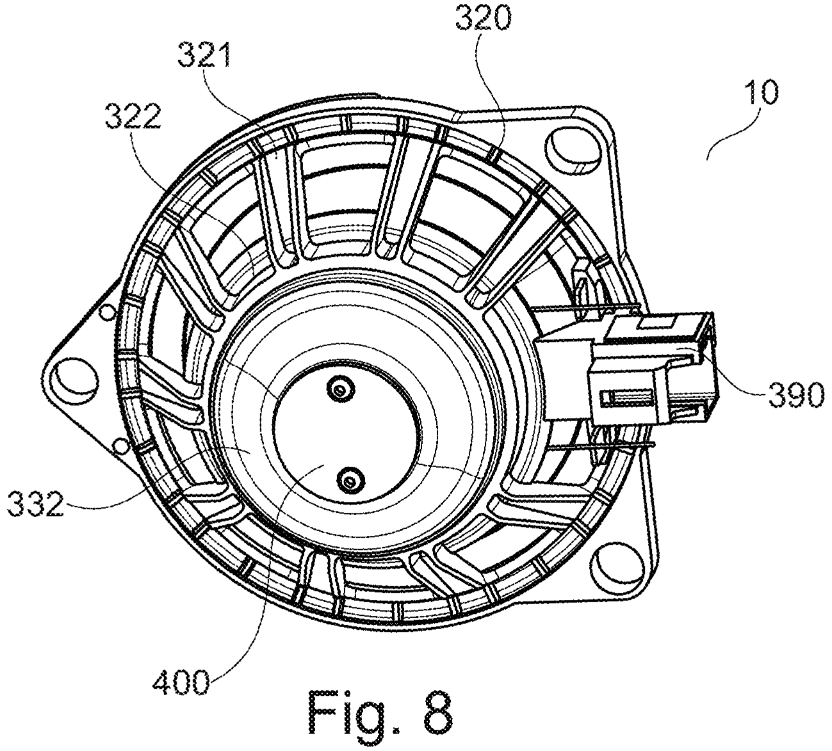
FIG. 8 shows a perspective rear view of the audio speaker.

FIG. 8 shows a rear view of the audio speaker 10. The frame 320 supporting speaker unit 300 includes support arms 321, which connect an upper part of the frame 320 to a lower part 322 of frame. Furthermore, the circuit board 400 is visible and the first pole piece 332. In addition, a connection section 390 is provided, providing a receptacle for a connector through which audio control signals can be transmitted to the speaker 10.

Figure 9:
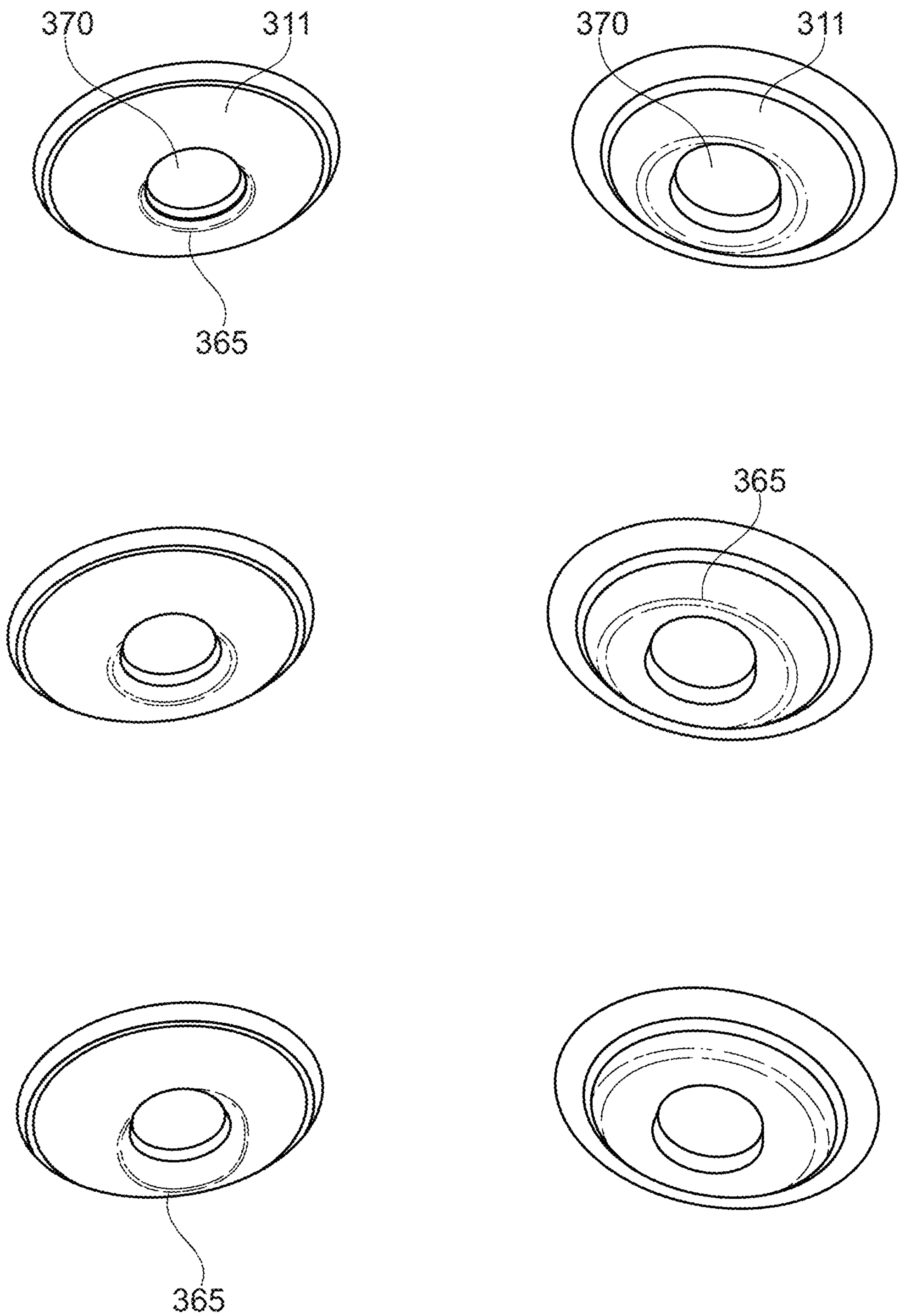
FIG. 9 shows a sequence of images of a front part of the audio speaker with different positions of the diaphragm and the corresponding illumination of a front surface of the diaphragm generated by a light source in dependence on the position of the diaphragm.

FIG. 9 indicates how an amount of light emitted through the transparent side surface providing the opening window depends on a position of the diaphragm for 2 different situations and cap and diaphragm geometry. The left column shows one geometry, the right column another geometry. In FIG. 9 the dashed lines 365 indicate to which extend the front surface 311 is illuminated by the light rays exiting the light guide in dependence on the position of the cap 370 relative to the light guide 100. In the drawing shown in the left column at the top, the dust cap 370 and the diaphragm is at its minimum excursion in a direction opposite the main sound emission direction, wherein the position of the dust cap increases in the two drawings shown on the left column of FIG. 9 until the maximum excursion of the diaphragm in direction of the sound emission direction is obtained at the lowest drawing in the left column of FIG. 9. The same situation is shown in the right column for a lightly different geometry of the diaphragm. When the frequency of the moving diaphragm is low, the change of illumination of the front surface 311 may be visible to the human eye, however at higher frequencies the change in illumination may not be visible any more to the human eye.

Figure 10:
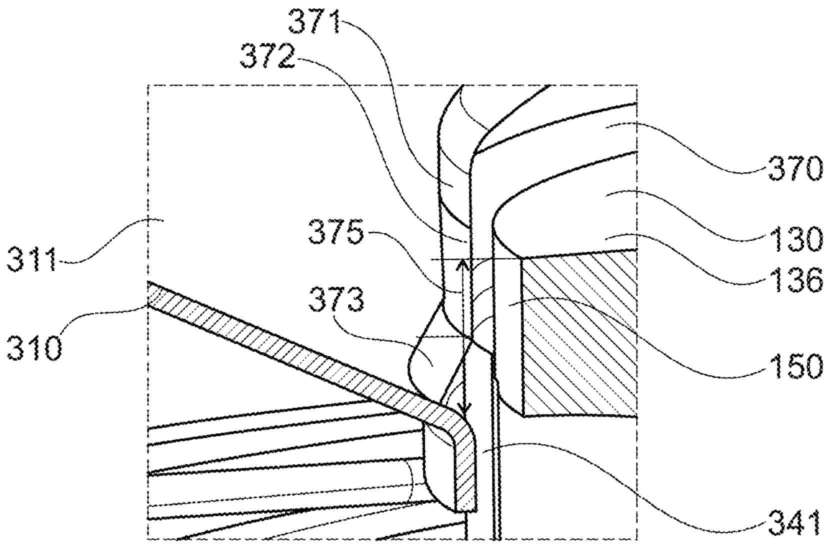
FIG. 10 shows an enlarged sectional view of a portion of the audio speaker where light exits the light guide to illuminate the front surface of the diaphragm.

FIG. 10 shows an enlarged view of the connection of the cap 370 with the top surface 371 having the non-transparent material. The connecting portion 373 is connected to the diaphragm 310. Furthermore, FIG. 10 shows the outlet portion 130 of the light guide 100 including the light emitting surface 150. As the transparent side surface 372 moves relative to the light guide and therefore relative to the light emitting surfaces 150 an opening window 375 is defined, which provides the part of the transparent side surface through which light emitted from the light guide can directly hit the front surface 311 of diaphragm 310. The size of this opening window changes together with the movement of the diaphragm and this opening window depends on a position of a lower edge of the top surface 371 with the non-transparent material relative to the position of the light emitting surface 150. Thus, the lower end of the opening window for the light is defined by the upper end of the support 341 for the voice coil, whereas the upper end of the opening window depends on a position of the top surface 136 of the light guide relative to a lower edge of the non-transparent material. The size of this opening windows changes in synchronization with the moving diaphragm.

Figure 11:
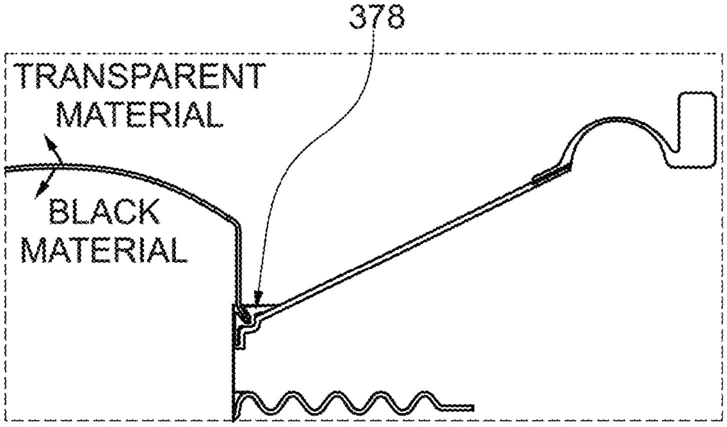
FIG. 11 shows a simplified sectional view of part of the audio speaker with a connection of a dust cap to the diaphragm and the voice coil.

FIG. 11 shows a sectional view which indicates how the cap 370 is connected to the diaphragm 310. The connecting portion 373 can be connected to the support 341 of the voice coil using an adhesive bonding as symbolized by the bonding area 378 shown in FIG. 11. This bonding area 378 helps to make sure that the support 341 for the voice coil does not obstruct the light path through the opening window 375. Furthermore it can be deduced that the dust cap may be made of transparent material wherein the top surface of the cap is coated with non-transparent material, so that light is only exiting the dust cap at the transparent side surfaces 372.

Figure 12:
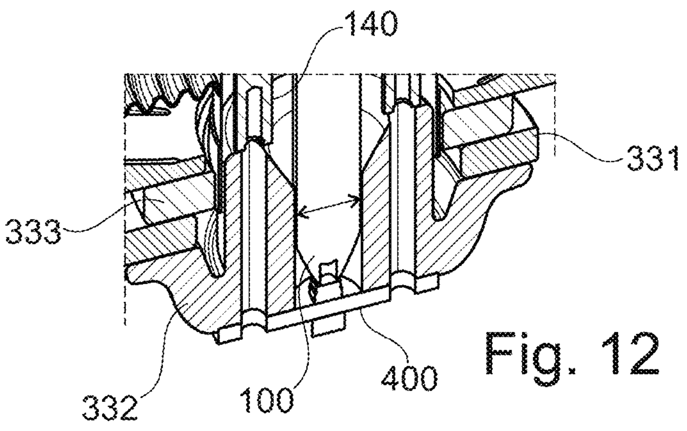
FIG. 12 shows an enlarged sectional view of a lower part of the audio speaker.

FIG. 12 shows a sectional view showing in more detail the connection of the drive unit 330 including the pole pieces 332 and 333 to the light guide 100, wherein the connecting arms 140 of the light guide are connected to the first pole piece 332. FIG. 12 shows the through holes in the pole piece 332 needed to introduce the fixing elements 500, which are inserted into the arms 140 of the light guide.

From the above said some general conclusions can be drawn:

As can be seen, especially from FIG. 2 the voice coil 340 encloses at least partly the light guide, especially the middle portion of the light guide, where the light is passed to the outlet portion of the light guide. The volume defined inside the voice coil can be used for the light guide to guide the light from a part located below the drive unit 330 to the part above the drive unit.

The audio speaker can furthermore comprise the cap 370, connected to a central part of the diaphragms 310 and the cap comprises a transparent side surface 372 providing an opening window through which the light exiting the light guide is passed to the front surface 311 of the movable diaphragm 310. The cap can furthermore comprise, in the main sound emission direction, a top surface with a non-transparent material, which is not transparent to the light from the light source.

The size of the opening window 375 through which the light is passed to the front surface changes with the movement of the movable diaphragm.

Furthermore, the light guide may contain an inlet portion 110 for the light emitted by the light source and an outlet portion 130 closer to the movable diaphragm 310 than the inlet portion, wherein the outlet portion 130 comprises reflecting surfaces configured to control a distribution of the light exiting the light guide through the opening window and illuminating the front surface of the diaphragm. The reflecting surfaces can contain the surfaces of the prism 135 and can furthermore contain the top surfaces 136 or 132 of the light guide 100. The opening window which emits the light in direction of the front surface of the diaphragm 310 can comprise, in the main sound emission direction, a lower end defined by an upper end of the support for the voice coil, and an upper end which depends on a position of the outlet portion of the light guide 100 relative to the top surface of the cap with the non-transparent material.

The inlet portion 110 can comprise collimating surfaces and/or a lens 115 configured to collimate the light emitted by light source to the reflecting surfaces of the outlet portion.

Furthermore, the circuit board 400 may be provided on which the light source 450 is located. The audio speaker furthermore comprises a drive unit 330 configured to generate the magnetic field for the voice coil. The circuit board can be connected in the main sound emission direction to a lower end of the drive unit.

The light source can be a light source emitting a single color, such as white light. However, it is also possible that the light source contains different light emitting elements, which emit light of different colors. Here, the light guide may be configured as a color mixing rod configured to mix the light such that the light of a uniform color exits the light guide.

The light guide is preferably fixedly connected to a drive unit configured to generate the magnetic field for the voice coil. The drive unit can contain a permanent magnet and one or several pole pieces, which make sure that a uniform magnetic field is generated in the free space where the voice coil is provided. The light guide can be fixedly connected to one of the pole pieces, which are used together with the magnet to generate the homogeneous magnetic field.

The audio speaker and the movable diaphragm may be designed as a cone speaker, where the movable diaphragm has a cone shape.

Summarizing the audio speaker discussed above provides an effective way for an illumination of a front surface of the diaphragm 310, wherein the light source is positioned such that the lifetime of the light source is not deteriorated by any heat generated within the audio speaker. Furthermore, a compact volume is obtained by simply adding and connecting a circuit board to a lower part of the loudspeaker.

What is claimed is:

1. An audio speaker configured to emit sound in a main sound emission direction, the audio speaker comprising:

a voice coil;

a movable diaphragm connected to the voice coil and configured to move together with the voice coil, the movable diaphragm comprising, a front surface and a rear surface opposite the front surface;

a light source configured to emit light, the light source being located below the voice coil in a direction of the main sound emission direction;

a light guide made of a transparent material and configured to guide the light emitted from the light source to the front surface of the movable diaphragm; and a cap connected to the movable diaphragm, the cap comprising a transparent side surface providing an opening window through which the light exiting the light guide is passed to the front surface of the movable diaphragm.

2. The audio speaker of claim 1, wherein the voice coil at least partly encloses the light guide.

3. The audio speaker of claim 1, wherein a size of the opening window changes with a movement of the movable diaphragm.

4. The audio speaker of claim 1, wherein:

the light guide comprises an inlet portion for the light emitted by the light source and an outlet portion closer to the movable diaphragm than the inlet portion; and the outlet portion comprises reflecting surfaces configured to control a distribution of the light exiting the light guide through the opening window and illuminating the front surface of the movable diaphragm.

5. The audio speaker of claim 4, wherein the reflecting surfaces comprise an upper end surface in the main sound emission direction, the upper end surface being substantially perpendicular to the main sound emission direction.

6. The audio speaker of claim 4, wherein the reflecting surfaces comprise an upper end surface in the main sound emission direction, the upper end surface being inclined relative to the main sound emission direction.

7. The audio speaker of claim 4, wherein the reflecting surfaces comprise a prism configured to direct the light from the light source in a direction of the opening window.

8. The audio speaker of claim 4, wherein the opening window comprises a lower end in the main sound emission direction and an upper end, the lower end being defined by an upper end of a support for the voice coil and the upper end of the opening window depending on a position of the outlet portion of the light guide relative to the top surface of the cap.

9. The audio speaker of claim 4, wherein the inlet portion comprises collimating surfaces configured to collimate the light emitted by the light source to the reflecting surfaces of the outlet portion.

10. The audio speaker of claim 1, further comprising:

a circuit board on which the light source is located; and a drive unit configured to generate a magnetic field for the voice coil;

wherein the circuit board is connected to a lower end of the drive unit in the main sound emission direction.

11. The audio speaker of claim 1, wherein:

the light source comprises light emitting elements emitting light with different colors; and the light guide is configured as a color mixing rod configured to mix the light with different colors such that light of a uniform color exits the light guide.

12. The audio speaker of claim 1, wherein the light guide is fixedly connected to a drive unit configured to generate a magnetic field for the voice coil.

13. The audio speaker of claim 1, wherein the movable diaphragm is a cone shaped diaphragm.

14. A system comprising:

an audio speaker configured to emit sound in a main sound emission direction, the audio speaker comprising a voice coil;

a movable diaphragm connected to the voice coil and configured to move together with the voice coil, the movable diaphragm comprising, a front surface and a rear surface opposite the front surface;

a light source configured to emit light, the light source being located below the voice coil in a direction of the main sound emission direction;

a light guide made of a transparent material and configured to guide the light emitted from the light source to the front surface of the movable diaphragm; and a cap connected to the movable diaphragm, the cap comprising a transparent side surface providing an opening window through which the light exiting the light guide is passed to the front surface of the movable diaphragm.

15. The system of claim 14, wherein the voice coil at least partly encloses the light guide.

16. The system of claim 14, wherein the audio speaker further comprises:

a circuit board on which the light source is located; and a drive unit configured to generate a magnetic field for the voice coil;

wherein the circuit board is connected to a lower end of the drive unit in the main sound emission direction.

17. The system of claim 14, wherein:

the light source comprises light emitting elements emitting light with different colors; and the light guide is configured as a color mixing rod configured to mix the light with different colors such that light of a uniform color exits the light guide.

18. The system of claim 14, wherein the light guide is fixedly connected to a drive unit configured to generate a magnetic field for the voice coil.

* * * * *